April 15, 1969   A. L. JOHNSON   3,438,800
SYNTHETIC ENAMEL COATING PROCESS
Filed Oct. 13, 1965
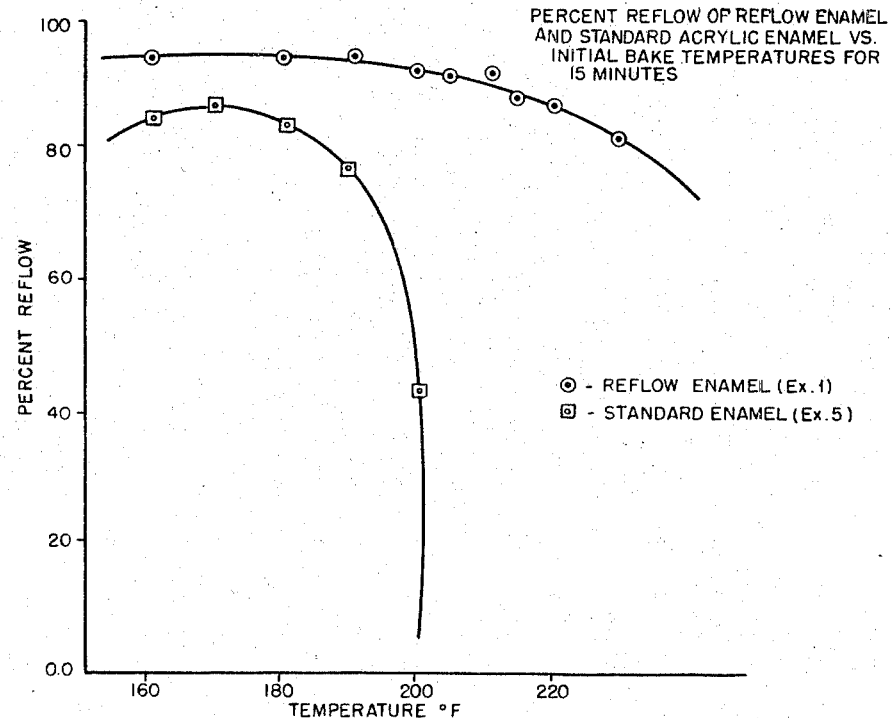
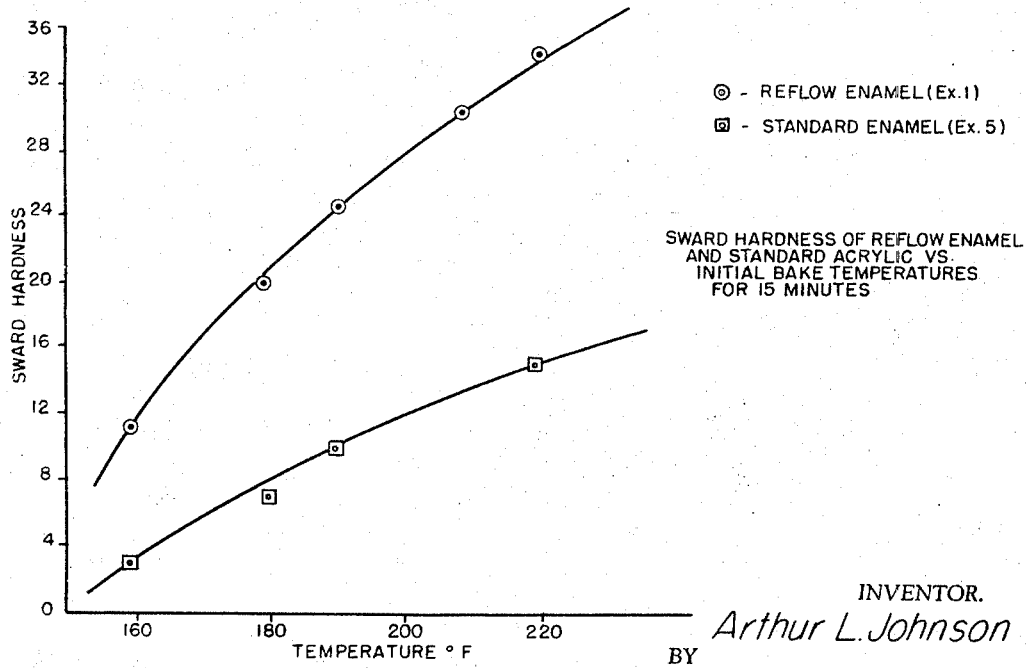
INVENTOR.
Arthur L. Johnson
BY
Herbert P. Price
Agent

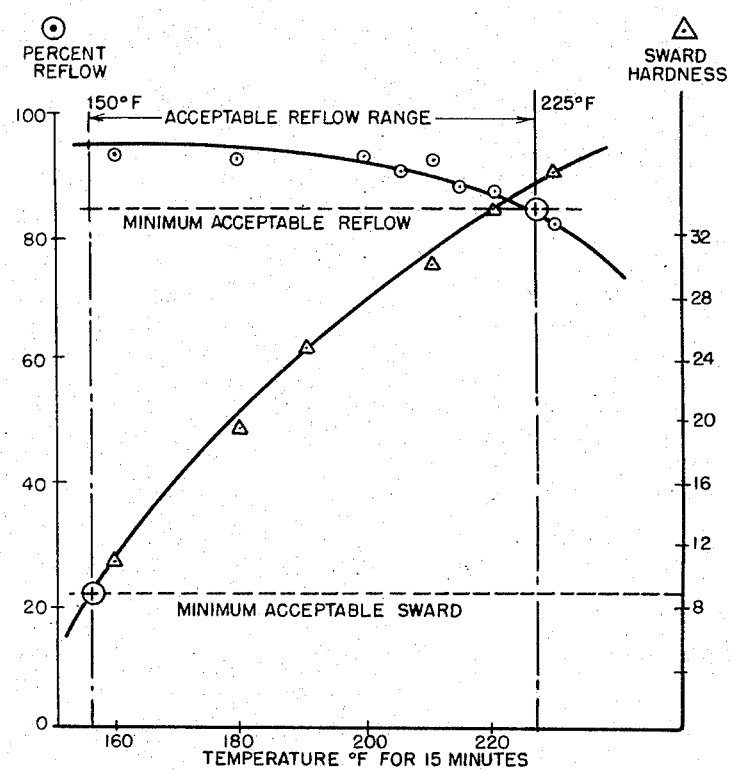

United States Patent Office 3,438,800
Patented Apr. 15, 1969

3,438,800
SYNTHETIC ENAMEL COATING PROCESS
Arthur L. Johnson, Farmington, Mich., assignor to Celanese Coatings Company, a corporation of Delaware
Filed Oct. 13, 1965, Ser. No. 495,662
Int. Cl. B44d 1/09, 1/46; C09d 3/52
U.S. Cl. 117—64                     6 Claims

ABSTRACT OF THE DISCLOSURE

A process for coating automobiles by applying to the surface of the automobile an enamel coating made from a hydroxy-carboxy acrylic copolymer and an aminoplast resin, heating the coating to harden it without curing it, sanding and repairing the coating, followed by reheating it to reflow the coating to remove sanding and repair marks and to cure the coating.

---

This invention pertains to a process for coating the exterior surfaces of automobiles and other objects. More particularly, this invention relates to a method for coating surfaces with thermosetting vinylidene copolymer enamels. In another aspect, this invention relates to thermosetting acrylic enamel finishes which can be sanded and repaired during processing Generally speaking, there are two types of automobile finishes—lacquers and enamels. Lacquers are solutions of high molecular weight polymers and copolymers which form films by evaporation of the solvents. Lacquer coatings are thermoplastic in nature and do not cure or crosslink during the film forming steps.

Enamels, on the other hand, are solutions of polymers and copolymers which contain functional groups capable of further reaction. After being applied to a surface, the polymers react through their functional groups, forming thermoset crosslinked compositions.

Automobile acrylic lacquers are generally high molecularweight homopolymers of methyl methacrylate, or copolymers of methyl methachrylate and other monomers copolymerizable therewith, the copolymers containing at least 90 percent by weight polymerized methyl methacrylate. In order to obtain workable viscosities, the copolymers are dissolved in strong solvents at low solids. Because of the low solids, it is usually necessary to spray three single coats of acrylic lacquer over the primer-coated automobile body at a slow spraying rate to obtain a film having desirable performance and appearance requirements. Solvents or thinners required are the more expensive solvents such as esters and ketones. The solvents are allowed to partially evaporate from one coat before the next coat is applied. The film is then force dried to evaporate the solvents and then is baked for 30 to 60 minutes at about 180° F. to about 250° F. Surface imperfections in the lacquer film can be removed by sanding or by overspraying. Upon further heating, the thermo plastic film will reflow over the sanding marks and the overspray lacquer will blend in with the original coating. The lacquer can then be polished to a smooth highly lustrous finish by wet sanding with a fine sand paper followed by polishing with a compound containing wax and rouge or other fine abrasive.

The most widely used automobile enamels are the alkyl resin type and the acrylic resin type. Such resins contain a plurality of unreacted alcoholic hydroxyl groups. These resins when blended with aminoplast resins will cure when baked to form highly cross-linked durable coatings. Such resin compositions before curing are generally of a lower molecular weight than lacquer resins, and solutions can be made having much higher solids concentrations. Thicker films can, therefore, be applied with less coats. On the production line, the enamel is sprayed over the primer-coated surface in two separate coats of one pass for each coat. The coating is then baked for 30 to 40 minutes at about 250° F. to form a highly durable paint finish.

One disadvantage of alkyd automobile enamels is the fact that they cannot be polished after curing. Polishing, as used herein, is defined as an actual abrasive polishing which cuts into the applied film to remove surface imperfections, such as the so-called orange peel, or dirt particles embedded in the film itself. This polishing operation is distinguished from other treatments of coated surfaces which merely involves the applications of a wax or oil to a coated surface or the use of a light abrasive cleaner or polish in which the abrasive is merely designed and used to aid in the removal of dirt attached to the dried surface of the film through ordinary use. Abrasive polishing of alkyd enamels dulls the surface of the film and the glossy finish cannot be recovered. Surface defects must either remain in the finish or the body must be refinished.

Automobile acrylic enamels on the other hand can be polished after curing. They can be polished in the same manner as lacquers to produce luxurious finishes having high gloss and a striking appearance of depth. A process for preparing polished acrylic enamels is disclosed in copending application Ser. No. 440,675, filed Mar. 18, 1965, now abandoned.

As discussed hereinbefore, automobile lacquer finishes, being thermoplastic, will reflow when reheated. Deep scratches from the sanding and polishing operation can be removed in this reflow step. Acrylic enamels, now being used commercially, are not readily adaptable to this reflow operation. Deep scratches and other blemishes, which cannot be removed by polishing, require a complete refinishing operation.

Acrylic enamels, as disclosed in U.S. application Ser. No. 440,675 filed Mar. 18, 1965, can be made to reflow under carefully controlled conditions. For example, an acrylic enamel can be heated at a specific temperature, say 200° F. for 15 minutes. The film after this heating period is dry to the touch but is still thermoplastic. It can be sanded and upon further heating will reflow and cure. However, the same film when heated at 180° F. for 15 minutes will be too soft to sand. When heated at 220° F. for the same time, it is cured to the point where it will not reflow.

The assembly of automobiles is a highly mechanized operation. Each step in the assembly is rigidly defined and must be carried out in the most efficient manner. It is necessary for efficient operation that the painting of the automobiles fits into this rigid schedule. Generally as the automobile body moves down the assembly line it is sprayed with the necessary number of coats of paint and then it passes through a heated oven. Although the oven is held at a specific temperature, the temperature of the metal will vary quite widely on different parts of the body. For instance, a baking schedule may be set for 15 minutes at 215° F. This means that the oven is heated to 215° F. and the automobile body moves through the oven in 15 minutes. Tests have been run checking the temperatures of the body at various points. The temperatures of the roof of the body have been found to reach 210° F. to 215° F., while the lowest portions of the body reached a temperature of only 160° F. Other portions of the body reached temperatures between these extremes. In addition to this temperature variation, occasional hold-ups in the assembly line operation may cause the automobile body to remain in the oven for extended periods of time. A commercially feasible reflow enamel system must have a satisfactory reflow after a wide range of initial and overbake heating cycles in order to be adaptable to commercial assembly line operations.

It has now been found that a commercially feasible reflow painting process can be obtained by applying to a metal surface an enamel made from pigments and a vehicle wherein the vehicle includes as a binder an aminoplast resin and a vinylidene copolymer. The copolymer has an acid value of 2 to 12, a glass transition temperature of 20° C.–85° C. and an alcoholic hydroxyl content of 1.15 to 3 percent. The aminoplast resin and the vinylidene copolymer are in the ratio of 20 to 40 weight percent aminoplast resin to 80 to 60 weight percent of vinylidene copolymer. The coating is heated at a temperature of about 150° F. to about 230° F. for a time sufficient to obtain a Sward hardness (as hereinafter defined) of at least about 9 while still in the thermoplastic state. The coating is sanded to remove surface imperfections and blemishes and upon further heating at a temperature above about 230° F., the coating reflows over the sanded portions and cures to a thermoset stage. Before the final heating step, the coating can be spot repaired with fresh enamel. Upon the subsequent heating step, the fresh enamel will blend in with the coating forming a smooth thermoset paint finish.

In carrying out the process of this invention, the enamel must reflow sufficiently over as wide a range as possible of initial bake temperatures with the development of a maximum toughness over this complete temperature range to allow for an adequately workable surface. A point of prime importance and worthy of emphasis is the ability of such a material to function over as wide a range of temperatures as possible. The wide degree of variance of metal temperatures of an automobile body in a production oven necessitates a maximum functional initial bake range for maximum flexibility. Too narrow a baking range of temperatures could possibly and quite probably result in soft-tacky unsandable coatings or overly cured un-reflowable films.

Most standard thermoset acrylic enamels can be made to reflow to some extent at one specific temperature. However, these same standard materials will not possess sufficient toughness over a range of baking temperatures to allow for a workable surface.

The compositions used in the process of this invention are specifically designed for reflow application, i.e., a bake-sand-bake reflow system. These compositions possess not only maximum reflow properties over a temperature range of wide latitude, but also have the tough sandable surface characteristics at low initial bake schedules necessary for complete flexibility in the operation of the system.

A comparison of a standard available acrylic enamel (Example 5) and an acrylic enamel used in the process of this invention (Example 1) is presented graphically in the attached figures.

FIGURE 1 exhibits the reflow properties, represented as the percentage gloss recovery on a totally reflowed film, as a function of initial bake temperature. The percentage gloss recovery, or reflow ratio, is defined as the gloss on the reflowed sanded film divided by the gloss on reflowed unsanded film multiplied by 100. The gloss can be determined in any manner known to those skilled in the art. In carrying out this invention, gloss determinations were made with a Gardner 20° Glossmeter, which measures the reflected light at an incidence angle of 20°, as compared with the reflectance of the light from a highly polished black glass. A minimum acceptable gloss recovery is at least about 80 percent. FIGURE 1 demonstrates the wide range of baking schedules that can be used with the compositions used in the process of this invention and the limited range that can be used with a conventional acrylic enamel.

To obtain a workable reflow system, the coating must be sufficiently tough and possess good sandability at the low temperature end of the reflow range. A comparison of this property, represented by Sward hardness, is presented in FIGURE 2. Sward hardness is determined with a Sward Rocker and is described in "Paint Testing Manual" 12th Edition—1962, by Gardner and Sward, page 138. The Sward hardness value is the hardness as compared to glass, wherein the glass hardness is taken as 100. The minimum Sward hardness required for acceptable sandability is about 9 percent.

The lower limit of the acceptable initial temperature reflow range is primarily dictated by that temperature at which the minimum acceptable toughness is attained. The upper limit is established by the maximum temperature at which the minimum reflow is still attained. FIGURE 3 depicts the acceptable reflow range for Example 1 of this invention. As can be seen from FIGURE 3, the minimum acceptable hardness is obtained at a temperature of about 157° F. at a 15 minute bake. The minimum acceptable reflow is obtained at about 225° F. for a 15 minute bake. The acceptable temperature range is about 157° F. to about 225° F.

FIGURE 4 shows the acceptable reflow range for a standard acrylic enamel, Example 5. The minimum acceptable hardness is attained at about 184° F. for 15 minutes. The minimum acceptable reflow is also attained at about 184° F. for 15 minutes. Example 5 therefore is limited to one temperature, 184° F. for a 15 minute bake.

The copolymers which are used to make the reflow enamels for the process of this invention are vinylidene copolymers having a specific range of acid values and glass transition temperatures ($Tg$). The acid value of copolymers which have suitable reflow properties is about 2 to about 12, with the preferred range being about 4 to about 8. Acid value is defined as the number of milligrams of potassium hydroxide required to neutralize 1 gram of the copolymer on a solids basis. The acid value is due to the presence of free acid groups in the copolymer. Generally, and preferably, the acid value is obtained from polymerized ethylenically unsaturated acid in the copolymer molecule, examples of such acids being acrylic acid, methacrylic acid, crotonic acid, etc. The acid value can also be obtained by adding a small amount of acidic catalyst to the copolymer, such catalyst being p-toluene sulfonic acid, butyl acid phosphate and the like.

At an acid value below 2, the films do not cure satisfactorily at final baking schedule. When the acid value is above 12, the films cure somewhat at the initial bake and do not satisfactorily reflow after sanding. However, when the acid value is held between 2 and 12, adequate reflow is obtained after the initial bake and sanding and excellent cures are obtained after the final bake.

Another important property of the copolymers is their glass transition temperature ($Tg$). $Tg$ is defined as the temperature at which a polymer changes from the glassy state to the rubbery state. (Principles of Polymer Chemistry by P. J. Flory, Cornell University Press (1953), p. 56.) It has been found that copolymers having a $Tg$ of 20° C. to 85° C. and preferably 35° C. to 60° C. will have a suitable reflow and hardness for the process of this invention and will have excellent durability and resistance properties as a finished enamel coating.

$Tg$'s of polymers and copolymers can be determined by heating the compositions and observing the temperatures at which the polymer changes from the glassy state to the rubbery state. $Tg$'s for a wide variety of copolymer compositions can be calculated based upon the $Tg$ values of homopolymers available in the literature and using the method of calculations described in the Journal of Polymer Science 28, p. 319–330 (1958). $Tg$'s of homopolymers are given in Rohm & Haas Company Publication SP-251 (6/64) described in Chemical & Engineering News, vol. 43, No. 31, p. 17, (Aug. 2, 1965). Knowing the $Tg$ of the homopolymers the approximate Tg of the copolymers can be readily determined by the following equation:

$$\frac{1}{Tg} = \frac{W_1}{T_1} + \frac{W_2}{T_2} + \frac{W_3}{T_3}$$

wherein Tg is the glass transition temperature of the copolymer in absolute degrees, $W_1$ is the weight percent of a particular monomer in the copolymer composition, $T_1$ is the glass transition temperature in absolute degrees of the homopolymer of the corresponding monomer, $W_2$ and $T_2$ are the weight percent and glass transition temperature of a second monomer and homopolymer, etc.

The copolymers used in the process of this invention are alcoholic hydroxyl containing vinylidene copolymers. The alcoholic hydroxyl groups serve as functional groups for reaction with aminoplast resins in subsequent curing reactions. The alcoholic hydroxyl groups are an integral part of the copolymer and result from the copolymerization of alcoholic hydroxyl containing monomers with other monomers. Suitable copolymers for use in this invention have an alcoholic hydroxyl content of about 1.15 to about 3 weight percent based on the total weight of the copolymer. This hydroxyl content can be obtained by polymerizing about 10 to about 25 weight percent of a monomer such as hydroxypropyl methacrylate with the copolymerizable monomers.

Polymerizable acids useful in the process of this invention are acids which contain one polymerizable ethylenic group and one carboxylic acid group. Such acids include acrylic acid, methacrylic acid and crotonic acid. Additional acids that can be used are alkyl half esters of unsaturated dicarboxylic acids, for example, monomethyl maleate, monoethyl fumarate and monobutyl itaconate wherein the alkyl group contains 1 to about 18 carbon atoms.

Polymerizable hydroxy containing monomers that can be used in this invention contain one polymerizable ethylenic group and at least one alcoholic hydroxyl group. Such monomers include allyl alcohol and crotyl alcohol. However, the preferred monomers are hydroxy esters of polymerizable acids, for example hydroxypropyl acrylate,
hydroxypropyl methacrylate,
hydroxyethyl crotonate,
butyl hydroxypropyl fumarate, and
methyl hydroxybutyl fumarate.

These monomers can be prepared by reacting a polymerizable acid as described above with a monoepoxide compound. Suitable monoepoxides are ethylene oxide, propylene oxide, butylene oxide, styrene oxide, glycidyl benzoate, glycidyl acetate, butyl glycidyl ether, isopropyl glycidyl ether and the like.

Other polymerizable monomers include alkyl acrylates and methacrylates wherein the alkyl group contains from 1 to about 12 carbon atoms. Such monomers are methyl methacrylate, ethyl acrylate, butyl acrylate, octyl acrylate, lauryl methacrylate and the like. Other monomers are styrene and alkyl substituted styrenes, acrylonitrile, vinyl pyrrolidone, etc.

Glass transition temperatures of several homopolymers made from monomers which can be used in this invention are as follows:

| Monomer: | Tg ° C. of homopolymer |
|---|---|
| Methyl acrylate | 8 |
| Ethyl acrylate | −22 |
| Isopropyl acrylate | −5 |
| n-Butyl acrylate | −54 |
| s-Butyl acrylate | −20 |
| t-Butyl acrylate | 41 |
| 2-Ethylhexyl acrylate | −85 |
| Cyclohexyl acrylate | 15 |
| Acrylonitrile | 96 |
| Methyl methacrylate | 105 |
| Ethyl methacrylate | 65 |

| Monomer—Continued: | Tg ° C. of homopolymer |
|---|---|
| Isopropyl methacrylate | 81 |
| n-Butyl methacrylate | 20 |
| Isobutyl methacrylate | 48 |
| s-Butyl methacrylate | 60 |
| t-Butyl methacrylate | 107 |
| n-Hexyl methacrylate | −5 |
| n-Octyl methacrylate | −20 |
| Lauryl methacrylate | −65 |
| Phenyl methacrylate | 110 |
| Cyclohexyl methacrylate | 66 |
| Isobornyl methacrylate | 110 |
| Bromoethyl methacrylate | 52 |
| 2-Hydroxyethyl methacrylate | 55 |
| Hydroxypropyl methacrylate | 26 |
| Styrene | 100 |

It is to be understood that the above monomers are not the only ones that can be used in this invention, but are given only to illustrate the Tg of the polymers as an aid to understanding this invention.

One skilled in the art, when given the limitations of acid value, glass transition temperature and alcoholic hydroxyl content, can quite readily select the proper combinations of monomers which will give these properties.

The enamels used in the process of this invention are made from pigments and a vehicle wherein the vehicle includes as a binder an aminoplast resin and a copolymer as hereinbefore defined. Aminoplast resins, as contemplated herein, include alkylated condensates formed by the reaction of amino-triazines and amino-diazines with aldehydes. Various amines and amides will condense in the presence of alcohols with aldehydes to form alkylated aldehyde-amine and aldehyde-amide condensates. Thus, urea, thiourea, and various substituted ureas and urea derivatives will react with aldehydes such as formaldehyde, in the presence of alcohols such as butyl alcohol to form alkylated urea-aldehyde condensates. Similarly, melamine, benzoguanamine, acetoguanamine, and other triazines will react with aldehydes to form condensates. Alkylated condensates result when the amine or amide is reacted with the aldehyde in the presence of alcohols such as methanol, ethanol, propanol, butanol, octanol, decanol, etc. In general, alkylated urea or melamine condensates of different degrees of condensation can be used so long as they are soluble in aromatic hydrocarbons or mixtures of these with other solvents. Alkylated melamine aldehyde condensates are the preferred aminoplast resins.

Generally at least about 20 percent, on a weight basis, of the aminoplast resin is combined with 80 percent of the copolymer. If less than 20 percent is used, the finished enamel coating is somewhat lacking in solvent resistance and durability properties. Normally, no more than about 40 percent aminoplast resin is employed since when higher amounts are used, the resulting coating is more brittle than desired and also lacks adhesion properties. Generally it is preferred to use sufficient aminoplast resin in the 20 to 40 percent range to yield a cured film having a pencil hardness of at least HB. Pencil hardness is described in "Physical and Chemical Examination of Paints, Varnishes, Lacquers and Colors," by Gardner & Sward, published by Henry A. Gardner Laboratory, Inc. (1950).

A wide variety of pigments can be used in the enamel compositions. Illustrative of such pigments are titanium dioxide, non-leafing aluminum, yellow iron oxides, red iron oxides, umber, sienna, carbon black, lampblack, phthalocyanine blues and greens, indanthrone blue, flavanthrone yellow, brominated anthanthrone orange, thio indigos, quinacridones such as Quinacridone Red (yellow shade), Quinacridone Red (blue shade) and Quinacridone Violet. The titanium dioxides, the carbon blacks and metallics are also used such as the metallic aluminum and the like. Inert materials can also be used if desired, for instance, silica, talc, china clay, the sulfates, etc. Pigments are used in proportions normally used in automotive enamels.

In carrying out the process of this invention, the enamel which is made up of pigments, hydroxy containing copolymer and aminoplast resin is adjusted to a suitable application viscosity with solvents, such solvents being aromatic hydrocarbons, alcohols, esters, ethers, ketones and mixtures thereof. The enamel is then sprayed to the desirable film thickness on the object to be coated. The applied coating is then heated at a temperature of about 150° F. to about 230° F. until the coating is dry to the touch, having a Sward hardness of at least 9. The heating time is generally from about 15 minutes to about 1 hour and preferably about 15 to about 30 minutes. After the heating operation, the coating is sanded to smooth the film and to remove surface imperfections. After rinsing with water, mineral spirits, naptha, or other inert liquids to remove the sanding dust, the coating is reheated at a temperature of about 230° F. to about 325° F. until a cure is obtained. Generally, this heating time is about 15 minutes to about 1 hour, and preferably about 15 minutes to about 30 minutes. The cured coating is a high gloss durable enamel which can be polished if desired.

The following examples illustrate the process of this invention in more detail. All parts given in the examples are parts by weight.

EXAMPLE I

Preparation of copolymer

To a suitable reaction vessel equipped with an agitator, thermometer, inlet tube and reflux condenser are added 5523 parts of xylene. To a second container are added 2751 parts of styrene, 3454 parts of n-butyl methacrylate, 1142 parts of 2-hydroxypropyl methacrylate, 18 parts of methacrylic acid and 147 parts of cumene hydroperoxide. After thoroughly mixing these monomers and catalyst, 751 parts of the monomer-catalyst solution are added to the reaction vessel. Heat is applied raising the temperature of the reactants to 280° F. in about 1 hour. The remaining monomer-catalyst solution is introduced at a rate of 150 parts per minute for a total of 45 minutes, while holding the temperature at 275° F. to 285° F. The temperature is held within this range for about 2 hours until substantially complete conversion of monomers to polymers is obtained. The polymer solution is then reduced to 45 percent solids by the addition of 1327 parts of n-butanol and 1971 parts of xylene. The Gardner-Holdt viscosity of the solution at 45 percent solids is P, the Gardner color is less than 1, the weight per gallon is 7.95 and the acid value on solids basis is 5.5

Preparation of enamel

A pastel blue metallic automotive enamel is prepared using the above copolymer solution at 45 percent solids in the following manner: 1.6 parts of a non-leafing aluminum are mixed under agitation for 10 minutes with 0.65 part of xylene and 2.52 parts of acetone. To this paste are added 2.67 parts of the copolymer solution, and this composition is agitated for an additional 10 minutes. The resulting composition is intermixed with 1.87 parts of a phthalocyanine blue paste previously prepared by sand grinding 13.77 parts of phthalocyanine blue pigment in 77 parts of the copolymer solution and 9.23 parts of xylene. To this mixture is added 58.8 parts of the copolymer solution and 24 parts of a butylated melamine-formaldehyde resin solution. The melamine-formaldehyde resin is at 60 percent solids in a 75/25 xylene/n-butanol solvent, and has a Gardner-Holdt viscosity of O to R, an acid value of 0.2 and a weight per gallon of 8.5. 5.26 parts of acetone and 2.63 parts of xylene are added to the resulting mixture and the total mixture is stirred until a smooth enamel results.

The resulting enamel is sprayed on a series of steel panels by the conventional method for automotive spraying. Each panel is then baked for 15 minutes at a different temperature wherein the temperatures range between 150° F. and 225° F. Half of each panel is sanded with 600 sand paper and water and is rinsed with mineral spirits. The panels are then baked at 250° F. for 30 minutes. The resulting panels are well cured and have a high gloss. The enamel is reflowed over the sanded portion and shows no sanding marks. The recovery of gloss on the sanded portion is well above 80 percent.

Additional steel panels are sprayed with the enamel and each panel is baked for 15 minutes at a different temperature, wherein the temperatures range from 150° F. to 225° F. A portion of the panel is then sanded down to the bare metal. More enamel is sprayed over this sanded area to cover the bare portions. After rebaking at 250° F. for 30 minutes, smooth, glossy, well-cured coatings are obtained.

EXAMPLE 2

Preparation of copolymer

To a suitable reaction vessel as described in Example 1 are added 5375 parts of xylene and 295 parts of cumene hydroperoxide. To a mixing vessel are added 2751 parts of styrene, 3454 parts of n-butyl methacrylate, 1123 parts of 2-hydroxypropyl methacrylate and 37 parts of methacrylic acid. 737 parts of this monomer mixture are added to the reaction vessel and the heat is raised to 270° F. in 1 hour. The remaining monomer mixture is then added at a rate of 111 parts per minute for a total of sixty minutes. After heating at 275° F.–285° F. for 2 hours, substantially complete conversion of monomers to polymers is obtained. The resulting polymer solution is reduced to 45 percent non-volatiles with 1327 parts of n-butanol and 1971 parts of xylene. The Gardner-Holdt viscosity of this solution is H, the Gardner color is less than 1, the acid value on a solids basis is 6 and the weight per gallon is 7.95.

Preparation of enamel

A solid color pastel blue automotive enamel is prepared from the above copolymer solution at 45 percent solids using the following procedure: A pigment paste is made by sand grinding 14.8 parts of titanium dioxide, 0.15 part of phthalocyanine blue, 3.14 parts of xylene and 3.34 parts of the copolymer solution. To this paste are added, under agitation, 48.06 parts of the copolymer solution, 19.8 parts of a butylated melamine formaldehyde resin as described in Example 1, 0.8 part of the monobutyl ether of ethylene glycol, 3 parts of an aromatic petroleum hydrocarbon, 4.86 parts of toluene and 2 parts of methyl isobutyl ketone. This mixture is stirred until a smooth enamel results. When this enamel is sprayed upon steel panels and is baked, sanded and baked as described in Example 1, a well-cured enamel with high gloss is obtained.

EXAMPLE 3

Using the same procedure as was described in Example 1, a copolymer solution is prepared from 36.35 parts of styrene, 45.65 parts of n-butyl methacrylate, 17.75 parts of 2-hydroxypropyl methacrylate, and 0.25 part of methacrylic acid. This copolymer at 45 percent solids in butanol and xylene has a Gardner-Holdt viscosity of P to Q, a Gardner color of less than 1, a weight per gallon of 7.79 and an acid value of 5.19 on solids basis. A pigmented enamel made with this copolymer using the procedure as described in Example 1, has excellent reflow properties.

EXAMPLE 4

Using the same procedure as was described in Example 1, a copolymer is prepared from 35.46 parts of styrene, 44.54 parts of n-butyl methacrylate, 19.75 parts of 2-hydroxypropyl methacrylate and 0.25 part of methacrylic acid. This copolymer when dissolved at 45 percent solids in xylene and butanol has a Gardner-Holdt viscosity of R, a weight per gallon of 7.91, a Gardner color of less than 1 and an acid value on a solids basis of 6.5. An enamel prepared from this copolymer using the same procedure as was described in Example 2 has excellent reflow properties.

EXAMPLE 5

A standard acrylic enamel is prepared from a copolymer having the following compositions: 179 parts of methyl methacrylate, 100 parts of styrene, 250 parts of n-butyl methacrylate, 279 parts of butyl acrylate, 175 parts of 2-hydroxypropyl methacrylate, and 17 parts of methacrylic acid. This copolymer at 45 percent solution in butanol and xylene has a Gardner-Holdt viscosity of P, a weight per gallon of 7.9 and an acid value on solids basis of 13. An enamel is prepared using the same procedure as described in Example 1. This enamel is sprayed on a series of steel panels and each panel is baked for 15 minutes at a different temperature ranging from 150° F. to 225° F. A portion of each panel is sanded with 600 sandpaper and water and is rinsed with mineral spirits. The panels are then baked for 30 minutes at 250° F. The panels are well cured, but the enamels have not reflowed adequately except in the case of the panel which had initially been heated at 184° F. The sand marks showed in the other panels and the gloss was not recovered.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for coating a surface which comprises the steps of
   (A) applying to the surface as a coating an enamel comprising a vehicle which includes as a binder an aminoplast resin (I) and a vinylidene copolymer (II), said copolymer having an acid value of 2–12, a glass transition temperature of 20° C. to 85° C., and an alcoholic hydroxyl content of 1.15 to 3.0 percent and wherein 20 to 40 percent of (I) is used with 80 to 60 percent of (II), the total being 100,
   (B) heating at 150° F. to 230° F. for a time sufficient for the coating to obtain a Sward hardness of at least about 9 while still in the thermoplastic state,
   (C) sanding the coating to remove surface imperfections, and
   (D) heating at a temperature above 230° F. for a time sufficient for the coating to reflow over the sanded portions and to cure the coating to the thermoset stage.

2. The process of claim 1 wherein the vehicle includes sufficient solvent for application viscosity.

3. The process of claim 1 wherein the enamel is comprised of pigments and the vehicle.

4. The process of claim 1 wherein the copolymer has an acid value of 4 to 8 and a glass transition temperature of 35° C. to 60° C.

5. The process of claim 1 wherein after the coating is sanded to remove surface imperfection, the coating is oversprayed with the enamel and is heated at a temperature above 230° F. for a time sufficient for the coatings to reflow and blend together and to cure to the thermoset stage.

6. The process of claim 1 wherein the initial heating is conducted at 150° F. to 230° F. for 15 to 30 minutes and the final heating is conducted at 250° F. to 300° F. for 15 to 30 minutes.

References Cited

UNITED STATES PATENTS

| | | | |
|---|---|---|---|
| 2,530,738 | 11/1950 | Spessard | 117—10 |
| 3,065,195 | 11/1962 | Vasta | 260—834 |
| 3,069,291 | 12/1962 | Levine et al. | 117—132 |
| 3,082,184 | 3/1963 | Falgiatore et al. | 117—132 |
| 3,098,835 | 7/1963 | Gaylord | 260—834 |
| 3,105,826 | 10/1963 | Jaggard | 260—834 |
| 3,198,850 | 8/1965 | Levantin | 117—132 |

MURRAY KATZ, *Primary Examiner.*

U.S. Cl. X.R.

117—132; 260—853